United States Patent
Longoni et al.

(10) Patent No.: US 6,721,566 B2
(45) Date of Patent: Apr. 13, 2004

(54) CELL UPDATE IN A CELLULAR COMMUNICATIONS SYSTEM

(75) Inventors: Fabio Longoni, Parque Technologico de Andalucia (ES); Atte Lansisalmi, Vantaa (FI); Jari Hartikainen, Salo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/777,751

(22) Filed: Feb. 5, 2001

(65) Prior Publication Data

US 2001/0018345 A1 Aug. 30, 2001

Related U.S. Application Data

(63) Continuation of application No. PCT/EP00/05230, filed on Jun. 6, 2000.

(30) Foreign Application Priority Data

Jun. 7, 1999 (GB) .............................. 9913221

(51) Int. Cl.[7] .............................. H04Q 7/20
(52) U.S. Cl. ................ 455/436; 455/428; 455/432
(58) Field of Search ................ 455/436, 428, 455/432, 435, 439, 440–445, 443, 452, 67.1, 453, 426, 509, 511, 560, 575, 550, 458, 449, 507, 419, 418, 414, 561; 370/338, 354, 385, 386, 329, 331, 335, 341, 342, 352, 353

(56) References Cited

U.S. PATENT DOCUMENTS

| | | | | |
|---|---|---|---|---|
| 5,649,286 A | * | 7/1997 | Frerking ..................... | 455/435 |
| 6,036,090 A | * | 3/2000 | Rahman et al. ............. | 235/380 |
| 6,275,706 B1 | * | 8/2001 | Rune ........................... | 455/458 |
| 6,292,667 B1 | * | 9/2001 | Wallentin et al. ........... | 455/458 |
| 6,339,705 B1 | * | 1/2002 | Pehrson ...................... | 455/419 |
| 6,374,112 B1 | * | 4/2002 | Widegren et al. ........... | 455/452 |
| 2001/0046863 A1 | * | 11/2001 | Rinne et al. ................ | 455/442 |

FOREIGN PATENT DOCUMENTS

| | | | | |
|---|---|---|---|---|
| EP | 0 898 438 | | 2/1999 | ............ H04Q/7/38 |
| FI | WO99/51051 A2 | * | 10/1999 | ............ H04Q/7/38 |
| FI | WO00/31988 A2 | * | 6/2000 | ............ H04Q/7/00 |
| FI | WO00/76245 A1 | * | 12/2001 | ............ H04Q/7/38 |
| SE | WO 99/20071 A1 | * | 4/1999 | ............ H04Q/7/38 |
| WO | 95 28063 | | 1/1995 | |

OTHER PUBLICATIONS

IEEE 0–7803–6465–5/2000 by Isnard, title–handling traffic classes..*

Spragins et al., Title: Telecommunications Protocol and Design, Jul. 1992, p. 282–284.

Aug. 16, 2000, International Search Report for PCT/EP00/05230; Aug. 9, 2000.

Aug. 1, 1997, "Concepts, Services and Protocols of the New GSM Phase 2+ General Packet Radio Service" Grasche, et al. IEEE Communications Magazine, US, IEEE Service Center, vol. 35, No. 8.

* cited by examiner

*Primary Examiner*—Edward F. Urban
*Assistant Examiner*—C. Chow
(74) *Attorney, Agent, or Firm*—Squire, Sanders & Dempsey L.L.P.

(57) ABSTRACT

The present invention relates to a method and arrangement for performing a cell update procedure in a cellular communications system. The cellular communication system comprises a plurality of cells, and a first and a second network controllers. A station is initially on a first cell controlled by the first controller and then in a second cell controlled by the second controller. When changing from one cell to another the station sends cell update information and other information to the second controller which then stores the received other information and send to the first controller a message indicating that information has been received at the second controller from the station. A network element for use in the above method is also disclosed.

18 Claims, 5 Drawing Sheets

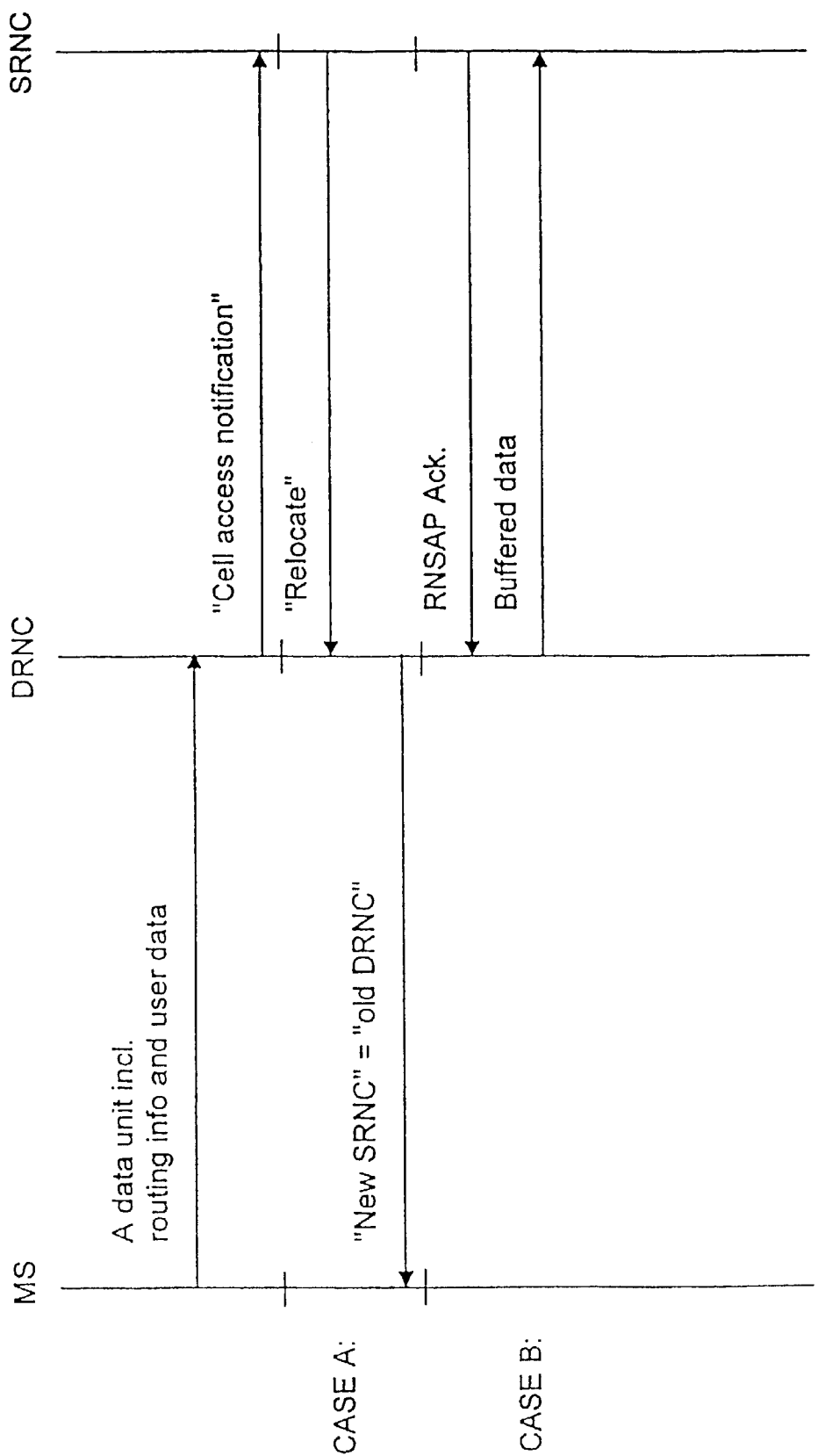

CELL UPDATE IN A CELLULAR COMMUNICATIONS SYSTEM

This application is a continuation of international application Ser. No. PCT/EP00/05230, filed Jun. 6, 2000.

FIELD OF THE INVENTION

The present invention relates to a method for performing a cell update procedure for a station in a cellular communications system. The invention relates further to an arrangement in a cellular communications system and an apparatus for use in the cellular communications system for implementing cell update procedures.

BACKGROUND OF THE INVENTION

A cellular radio network system, such as the proposed CDMA (Code Division Multiple Access) or UMTS (Universal Mobile Telecommunications System) or various GSM (Global System for Mobile communications) based systems (such as GPRS: General Packet Radio Service), consists of cells. In most cases the cell can be defined as a certain geographically limited area covered by one or several base stations (BS) serving mobile stations (MS) via an air interface and connected to a base station subsystem (BSS). Several cells cover a larger area, and form the coverage area of a cellular radio network. E.g. in the proposed CDMA standard each cell is controlled by a radio network controller (RNC). The mobile station (MS) or user equipment (UE) within one of the cells of the system is controlled by a serving radio network controller (SRNC) which is connected further to a gateway apparatus, such as a serving GPRS support node (SGSN), linking the cell to the other parts of the communication system. In addition to the SRNC, the MS may also be connected to a drift RNC (DRNC). Where the MS is in soft handoff and thus in communication with two base stations, those base stations may be connected to different RNCs. One RNC is the serving RNC (SRNC) and one is the drift RNC (DRNC). The DRNC is located in the communication path between the BS, which it controls, and the SRNC. The control of the connection to the other parts of the communications system will be accomplished by the SRNC.

In a 'cell update' mode or similar situation, i.e. when the MS in RACH/FACH (Random Access Channel/Forward Access Channel) mode enters a new cell (i.e. moves from the coverage area of one cell to a next cell or is switched on), the MS sends a message containing a MS (or UE) identifier (ID). This MS ID is valid in all networks conforming the standard in question. In the case of the proposed CDMA standard, the MS ID is valid in all UTRANs (Universal Mobile Telecommunications System Terrestrial Radio Access Network). This MS ID comprises the SRNC ID identifying the particular SRNC and the sRNTI identifying the MS within the SRNC. This sRNTI is the identifier used by the SRNC within the SRNC. This MS ID is sometimes referred to as routing information.

There are proposals that this MS routing information message could be in a form of a 'Cell Update Request Message' where the MS requests that the cell be updated. Alternatively this message could also be part of a message which also contains user data.

The RNC controlling the new cell (i.e. the target RNC) may be different from the one that controlled the previous cell. The previous cell may be controlled by a DRNC or a SRNC. The target RNC may be different from the SRNC. The following concerns cases where the target RNC and the SRNC are not the same.

This MS routing message may be sent by the MS by using CCCH (Common Control Channel) logical channel or DCCH (Dedicated Control Channel) logical channel. The CCCH uses only MAC-c services. Located in the target RNC, MAC-c (Medium Access Control-c) is a controller which controls the RACH/FACH channels. The DCCH messages use the services provided by MAC-c and RLC (Radio Link Controller) which are also located in the SRNC.

Reference is now made to FIG. 1 which shows the L2 (Layer 2 of the protocol stack of ISO OSI model: link layer) model functional split between the SRNC 100 and the DRNC 102. More particularly, FIG. 1 shows the MAC units 104 and 106 of the SNRC 100 and the MAC units 108 of the DRNC 102. The MAC (Medium Access Control) function is split across Iur interface 110 between the DRNC 102 and the SRNC 100. The SRNC 100 and DRNC 102 each have a Radio Resource Controller RRC 114 and 116, respectively. The RNSAP (Radio Network Subsystem Application Part; in the control plane) protocol is used for pair to pair L3 (Layer 3) signalling between the RRCs 114 and 116 of the SRNC and the DRNC. In the SRNC 100, there is a PCCH (Paging Control Channel) between the RRC (Radio Resource Control) 114 and a first MAC unit 114. The first MAC unit outputs a PCH (Paging Channel) to a base station. A CCCH (Common Control Channel) is provided between the RRC 114 and the second MAC unit 106. The second MAC unit 106 outputs the FACH (Forward Access Channel) and receives the respective RACH (Random Access Channel). In the DRNC 102 DCCH (Dedicated Control Channel) is provided between the RRC 116 and the MAC units 108. Even though not shown, a RLC (Radio Link Control) is located on the DCCH between the RRC 116 and the MAC units 108. The Frame Protocol (user plane) 112 is used to carry MAC-d PDU (Protocol Data Unit) between the drift and serving RNCs.

After the SRNC has been notified about the access of the MS to a new cell, the SRNC makes a decision whether to perform a relocation (i.e. a new SRNC is required) before sending a downlink ACK (acknowledgement) to the mobile station MS, or whether there is no need for relocation proceedings. If relocation is required, the serving RNC will change. If there is no need for relocation proceedings and the SRNC and the RNC controlling the new cell are different, the RACH/FACH data streams from and to the MS will then be conveyed on the Iur interface between the SRNC and the new RNC via Iur Frame Protocol.

In the earlier proposals it has been suggested that the initial access message be transmitted by the MS. The message, which is hereby referred to as the 'Cell Update' message, may be any message containing the required routing information in order to be able reach the SRNC. The routing information consists of the SRNC ID and the sRNTI as discussed above.

One possible solution for implementing the above could use the MAC model such that the Cell Update message is sent on the CCCH from the MAC of the target RNC to the RRC of the target RNC and carried over RNSAP to the SRNC. Even though this would be easy to implement, the MS, however, cannot send to the new target RNC an initial access message which requires MAC and RLC services (Radio Link Control services). Those MAC and RLC services can include ciphering, RLC retransmission (especially if the message contains user data) or an authentication and/or integrity check. Authentication is security feature used for ensuring the identity of the transmitting party, and integrity check can be used for verifying that the contents of the transmission correspond the original message. Both of these could be a part of RLC or RRC (Radio Resource Control).

According to another proposal, the Cell Update message could be sent over the DCCH between the MAC and the RRC of the target RNC, and the MAC PDU of the target RNC could then be carried in the RNSAP message from the RRC of the target RNC to the RRC of the SRNC. However, carrying the MAC PDU in L3 messages is not compliant with the current protocol stack. From FIG. 1 it can be seen that MAC-d PDUs are carried via Frame Protocol (FP), not via RNSAP. This solution could cause some problems in view of the current RNC implementation proposals.

According to another proposal, the Cell Update message could be sent over DCCH between the MAC and the RRC of the target RNC. A CRNC (Controlling Radio Network Controller: the RNC including the MAC-c for the cell) could start the setup of the CCH FP and the MAC-d PDU is conveyed from the MAC of the SRNC using the Frame Protocol (FP). The problem with this solution is that the CCH support over the Iur would require a new protocol (user plane on the Iur interface) that is not otherwise needed if the SRNC decides to perform the relocation (after which the user plane will become useless). The user plane is not needed also if the message is e.g. a URA (UTRAN Registration Area: a group of cells) update.

It is noted herein that the above proposals do not necessarily constitute the state of the art.

SUMMARY OF THE INVENTION

It is an aim of the embodiments of the invention to address one or several of these problems.

According to one aspect the present invention provides a method of performing a cell update procedure for a station in a cellular communications system, the cellular communication system comprising a plurality of cells, and a first and a second network controllers, said station initially being on a first cell controlled by the first controller and then in a second cell controlled by the second controller, the method comprising the steps of:

sending, when the station is in the second cell of the system, cell update information and other information from the station to the second controller;

storing the received other information at the second controller; and sending from the second controller to the first controller a message indicating that cell update information has been received at the second controller from the station.

According to a further aspect, the present invention provides an arrangement in a cellular communications system, the cellular communications system comprising a plurality of cells, a first controller controlling a first cell of the plurality of cells, a second controller controlling a second cell of the plurality of cells, and a station capable of communicating with said controllers, comprising:

means for sending, when the station changes from communicating with the first controller to communicate with the second controller, cell update information and other information from the station to the second controller;

storage means at the second controller for storing the received other information; and means for creating and sending from the second controller to the first controller a message indicating that cell update information has been received at the second controller from the mobile station without sending said other information to the first controller.

According to a still further aspect, the invention provides an apparatus for use in a cellular communications system, the cellular communications system comprising a plurality of cells, a first controller controlling a first cell of the plurality of cells, a second controller controlling a second cell of the plurality of cells, and a station capable of communicating with said controllers, wherein the cellular communications system is such that when the station changes from communicating with the first controller to communicate with the second controller cell update information and other information is sent from the station to the second controller, said apparatus comprising:

storage means at the second controller for storing the other information upon receipt at the second controller; and means for creating and sending from the second controller to the first controller a message indicating that cell update information has been received at the second controller from the mobile station.

By means of the proposed solution it may be possible to perform the cell update from one cell to a new cell controlled by another controller (for example, a drift RNC) in a cellular communication system such that the CCH user plane does not need to be a mandatory part of the interface between the new and serving RNCs. The MS may use data units (e.g. DCCH or DTCH) for the access to the new cell. This enables, for example, the MS to send user data or use authentication and/or integrity checks which could not be possible in the above discussed earlier proposals. By preventing establishment of unnecessary user plane connections and using a data packet unit instead of conventional signaling it may also be possible to reduce the amount of signaling load caused by roaming user equipment or mobile stations.

Embodiments of the present invention may avoid use of a mandatory user plane in the interface between a new RNC and a serving RNC. More generally, embodiments of the present invention may avoid the establishment of unnecessary user planes between radio network controllers of the cellular radio communications system. In addition, embodiments of the invention may allow the amount of signaling load caused by roaming mobile stations to be reduced, especially between a drift RNC and a serving RNC.

BRIEF DESCRIPTION OF THE DRAWINGS

For a better understanding of the present invention and as to how the same can be carried into effect, reference will now be made by way of example to the accompanying drawings in which:

FIG. 5 shows a signaling flow chart for the embodiment of FIG. 4.

DESCRIPTION OF THE PREFERRED EMBODIMENTS

Figure 1:
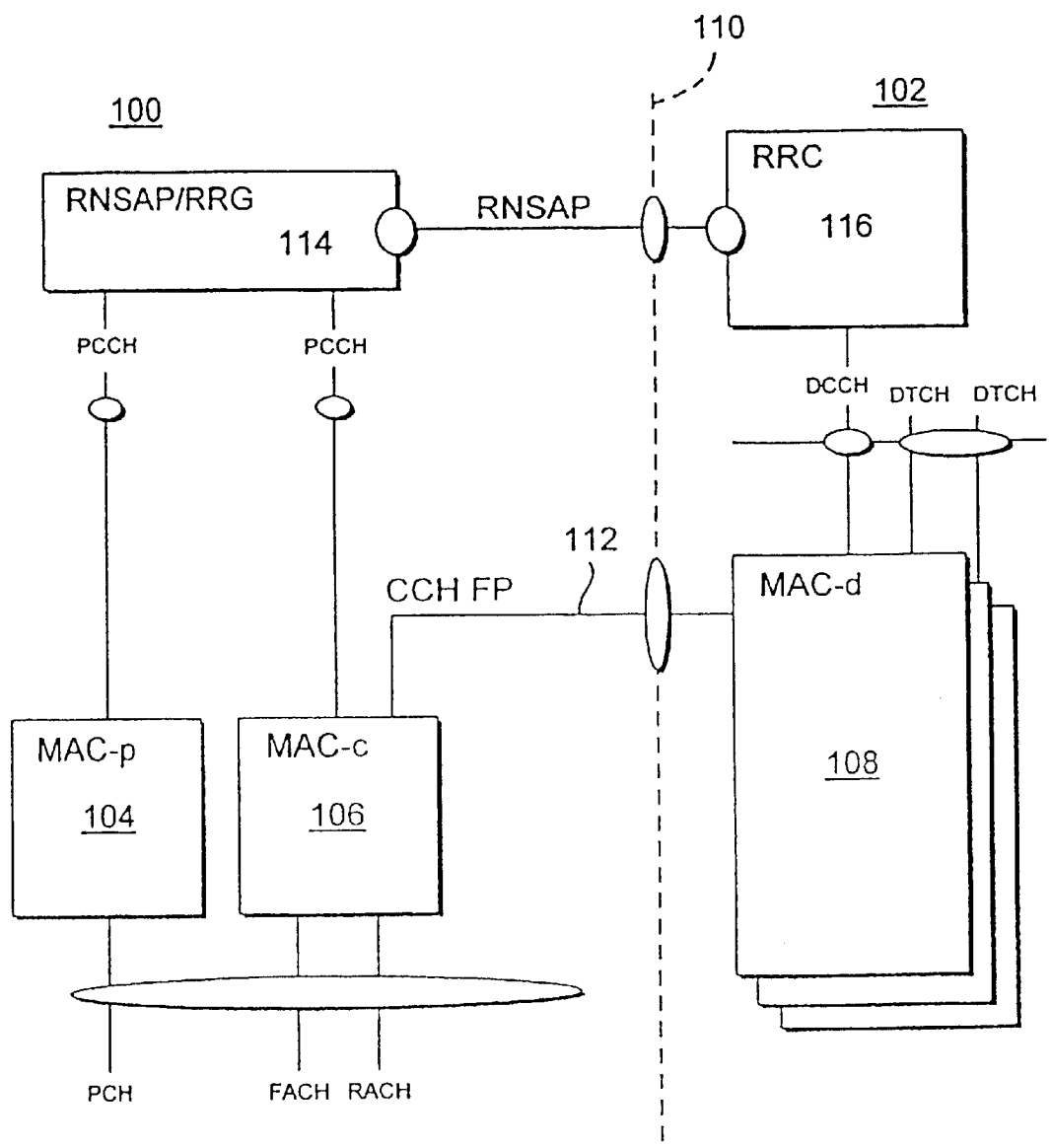
FIG. 1 shows an Iur interface between a SRNC and a DRNC.
Figure 2:
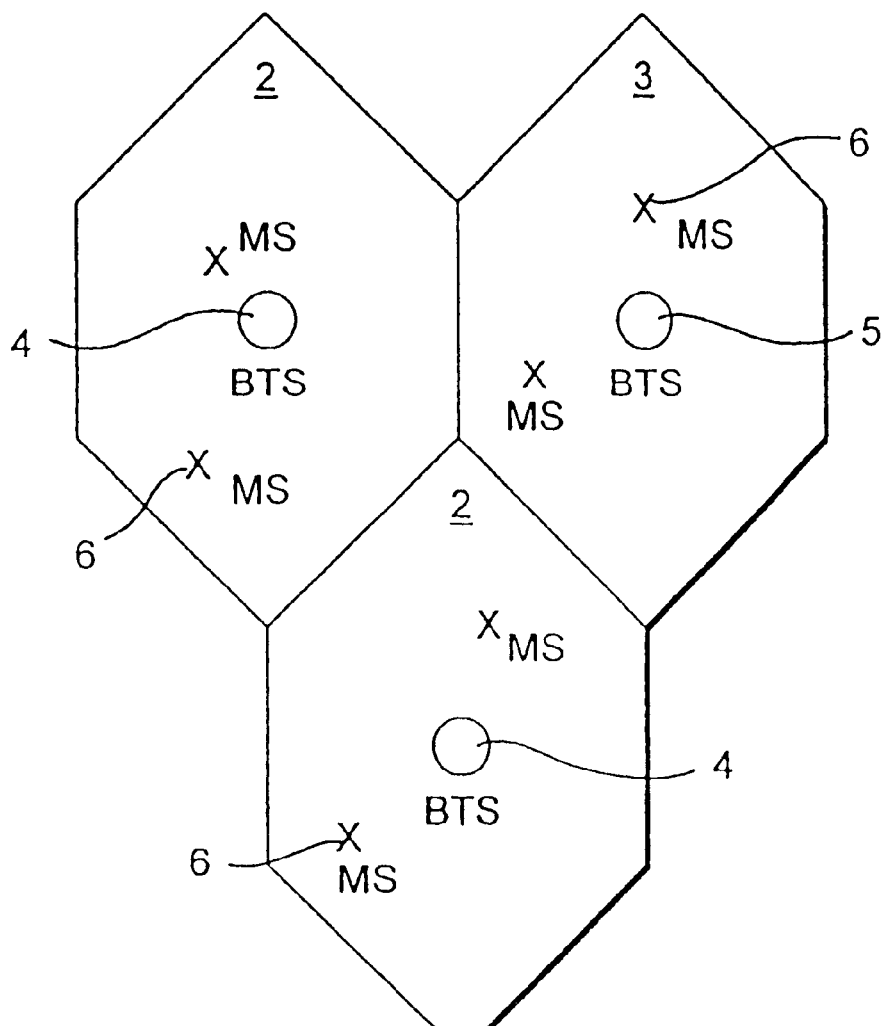
FIG. 2 shows a schematic diagram of a cellular radio network system in which embodiments of the invention can be implemented.

Reference will first be made to FIG. 2 in which three cells 2,3 of a cellular telecommunications network are shown. Each cell 2,3 is served by a respective base transceiver station (BTS) 4,5. Each base transceiver station (BTS) 4,5 is arranged to transmit signals to and receive signals from the mobile stations (MS) 6 located in the cell associated with the given base transceiver station 4,5. Likewise, each mobile station 6 is able to transmit signals to and receive signals from the respective base transceiver station 4,5, and also able to move from the coverage area of one cell 2 to the coverage area of another cell 3.

The exemplifying cellular telecommunications network described in more detail in the following is a wideband code division multiple access (WCDMA) network.

Figure 3:
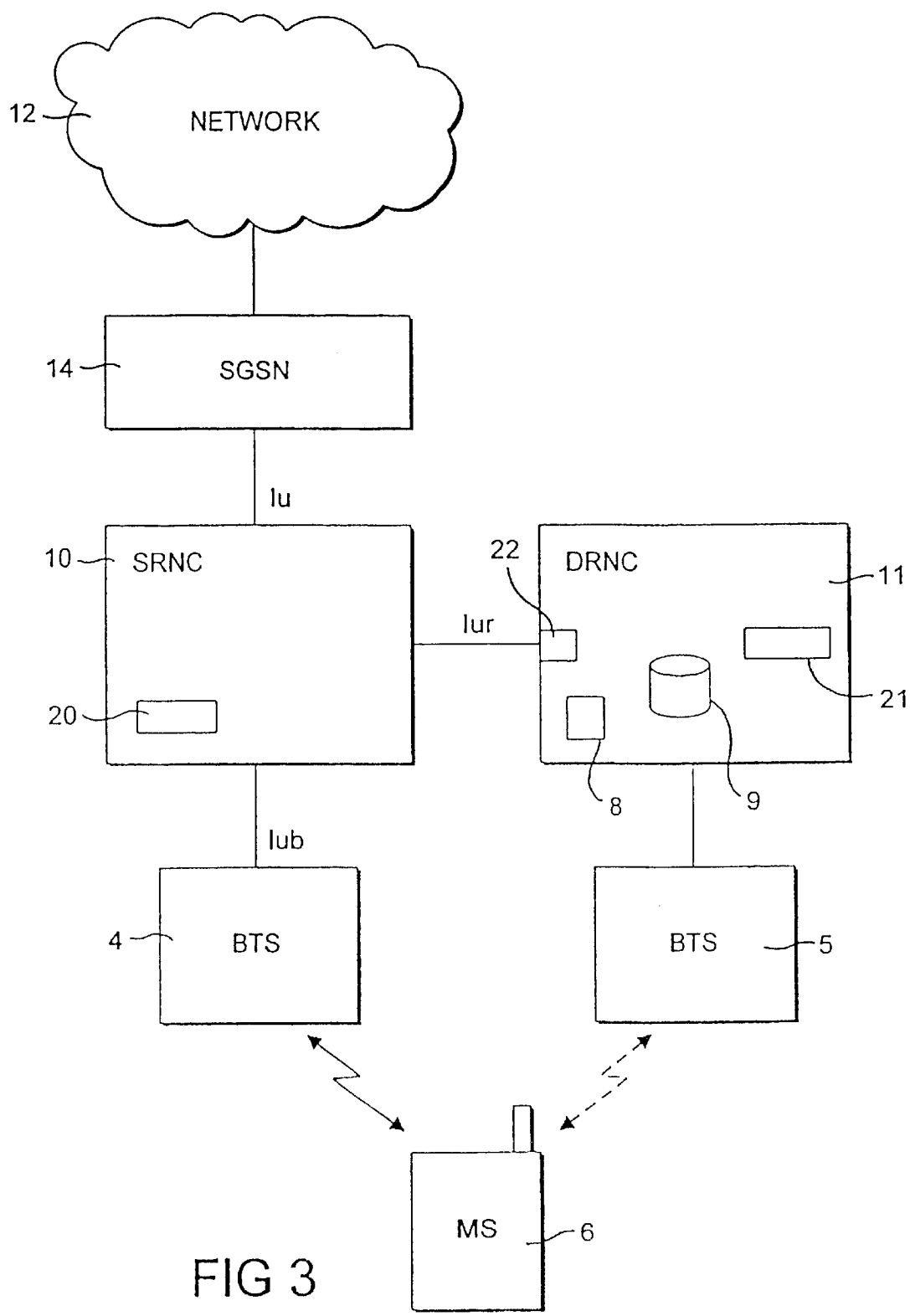
FIG. 3 shows the hierarchy of various elements of the network of FIG. 2.

Reference is made to FIG. 3 which shows the hierarchy of a CDMA system. As can be seen, the mobile station 6 is in wireless communication with the base station. Typically a number of mobile stations will be in communication with each base station although only one mobile station is shown in FIG. 3 for clarity. The base station 4 is connected to a serving radio network controller SRNC 10. Again more than one base station is usually connected to each SRNC 10 although only one is shown for clarity. Typically more than one RNC is also provided in a network. The SRNC 10 is connected to other elements of the network 12 via a suitable linking or gateway apparatus, such as a serving GPRS Support Node (SGSN).

The SRNC 10 is arranged to control the base station and also passes on the data packets to be transmitted to the mobile station by the base station. The SRNC 10 will also receive from the base station packets of data which it has received from the mobile station.

Common channels are defined between the mobile stations in the cell associated with a given base station and the serving controller. These common channels are the forward access channel (FACH) in the downlink direction and the random access channel (RACH) in the uplink direction. The common channel may alternatively be a downlink shared channel (DSCH) to which a number of mobile stations are allocated. With common channels the same spreading code is used for all communications on a given channel. The data sent to the mobile station and the data sent from the mobile station is in packet form. The data packets (data units) which are sent to the mobile stations on the FACH will include information identifying the mobile station for which a given packet is intended. A mobile station will receive all the packets sent on the common FACH channel and is able to identify the packets which are intended for it from the information identifying the mobile station. Similarly packets of data which are transmitted to the base station by the mobile stations on the common RACH channel will include information in the data packet which allows the base station to identify from which mobile station the data packet has been received.

The base station receives the frames in the RACH channel from the mobile stations and forwards these frames to the SRNC 10 via the Iub interface between the base station 4 and the SRNC 10. The packets of data to be transmitted to the mobile station on the FACH channel are received by the base station from the SRNC 10. The packets are transferred from the SRNC 10 to the base station 4 via the Iub interface. For the transmission of packets between the base station 4 and the SRNC 10, the CCH (common channel) frame protocol is used.

In addition to the serving RNC 10, the cellular telecommunications system of FIG. 3 includes a drift RNC 11 controlling the base station 5 of cell 3 of FIG. 2. The SNRC 10 and DRNC 11 may communicate with each other over an Iur interface established between them. In FIG. 3 the MS or similar user equipment communicates firstly with the BTS 4 over an air interface designated by a solid line and then switches to communicate with a new BTS 5, as designated by the dashed air interface, after having moved in the service or illumination area of BTS 5. In order to ensure a proper operation of the system and to avoid disconnecting a possibly ongoing call, a handover procedure is required so that all necessary information will become available for the parties involved (i.e. for the SRNC, DRNC and the MS). In some embodiments of the invention, the mobile station may be in communication with both base stations 4 and 5 during a soft handoff procedure.

The access to a new cell 3 can be performed over a DCCH or DTCH (Data Common Channel or Dedicated Traffic Channel, respectively). The MS 6 sends a data packet (or several packets) or another suitable data unit which includes the routing information. There is no need for any further messaging. The MAC-c unit in the DRNC 11 receives the message and reads the routing information (sRNTI and SRNC ID) from the data packet. The MAC identifies the SRNC associated with the SRNC address and sends a RNSAP message (referred to as 'Cell access notification' message) to the SRNC. This message comprises the MS routing information. This message can also be any other type of message simply indicating that the MS is now sending information to the DRNC 11. It is to be noted that this message sent to SRNC 10 does not necessarily contain the MAC-d PDU. In other words, the routing information can be removed from the message and the remaining packet data (or even all packet data) can be buffered in the DRNC 11 to an appropriate data storage (designated by 9 in FIG. 3). This also means that the SRNC (and even the DRNC) is not aware of the actual contents of the data packets. The data packets may include a RRC cell update message, an URA update message, a RRC connection re-establishment message, user data, etc. Instead, the DRNC 11 simply notifies the SRNC 10 about the access of the MS 6 to a new cell 3, and the message needs to contain only the MS ID in the SRNC (sRNTI), the new cell or DRNC ID and the MS ID used by the DRNC. This is similar to the sRNTI.

When the SRNC receives the access notification from the DRNC, the SRNC decides whether to perform the relocation proceedings (case A below) or not (case B below) (see also the signalling flow chart of FIG. 5). This decision making procedure can be based on any suitable criteria. For example, if the MS is moving and is likely to move back into a cell controlled by the SRNC, the relocation may not be performed.

Case A: SRNC performs the SRNC relocation procedure. The relocation procedure is used to move the Iu connection which is between the SRNC and the SGSN from the SRNC to the DRNC, which then becomes the new SRNC entity. In other words, the Iu interface will be established between the DRNC 11 (which now be the SRCN) and the SGSN. In the procedure the user plane macrodiversity combination point, UTRAN control plane handling entities and the Iu links and any other necessary functions are relocated. The user plane macrodiversity combination point is moved from the SRNC to the new SRNC and signals from different base stations served by different RNCs will be combined in the new SRNC, when the MS is in soft handoff. At the completion of the procedure, the MAC-d PDU or remaining data from the MS which has been stored in the buffer will be passed to the MAC-d entity (that is now located in the Target RNC, i.e. in the new SRNC). The RRC protocol (or MAC-d) in the new SRNC is arranged to trigger the sending of the buffered MAC-d PDU at the completion of the relocation procedure.

Case B: The relocation will not be performed, but an CCH user plane is established over the Iur. The SRNC sends a RNSAP Ack message to the DRNC (referred to as Cell Access Ack message) in response to receiving the access notification. The Cell Access and Cell Access Ack messages contain all the information needed for the initialization of the CCH data streams over the Iur interface between the drift and serving RNCs, as in the current Uplink Transfer and Downlink Transfer messages defined in 3GPP ($3^{rd}$ Generation Partnership Project), but without any of the data stored in the DRNC (or generic AIF PDU; Air Interface PDU). On receiving of the Cell Access Ack message, the DRNC sends the stored information to the SRNC using the CCH Frame Protocol connection. The SRNC may also send any downlink message via the same frame protocol connection to the MAC unit in the DRNC.

FIG. 3 shows also schematically various means for implementing the above described functions. The DNRC 11 is shown to include means 8 for creating and sending the message indicating that cell update information has been received from the MS 6. This control unit 8 can comprise a processor device and/or appropriate software for accomplishing the tasks. It is noted that even though shown as being in the form of a single unit in FIG. 3, said means 8 can also consist of a two or several separate units implementing the creating and transmitting functions. These separate units would then have an operational connection therebetween. In addition, the DRNC or the new (or second) radio network controller 11 may comprise means 21 for receiving the cell access acknowledgement and for processing the stored information accordingly, i.e. retrieving it from the database or record 9 and transmitting it to the SRNC 10. The means for receiving the cell update acknowledgement and the means for transmitting the stored information can comprise a single processing unit 21, or then they may be two or several separate units having an operational connection therebetween. The DRNC 11 may also be provided with means 22 for establishing the interface between the RNCs before the information stored at the storage means 9 is sent by means 21 from to the DRNC 11 to the SRNC 10. SNCR 10 is shown to comprise means 20 for sending the cell access acknowledgement message in case B described above.

Figure 4:
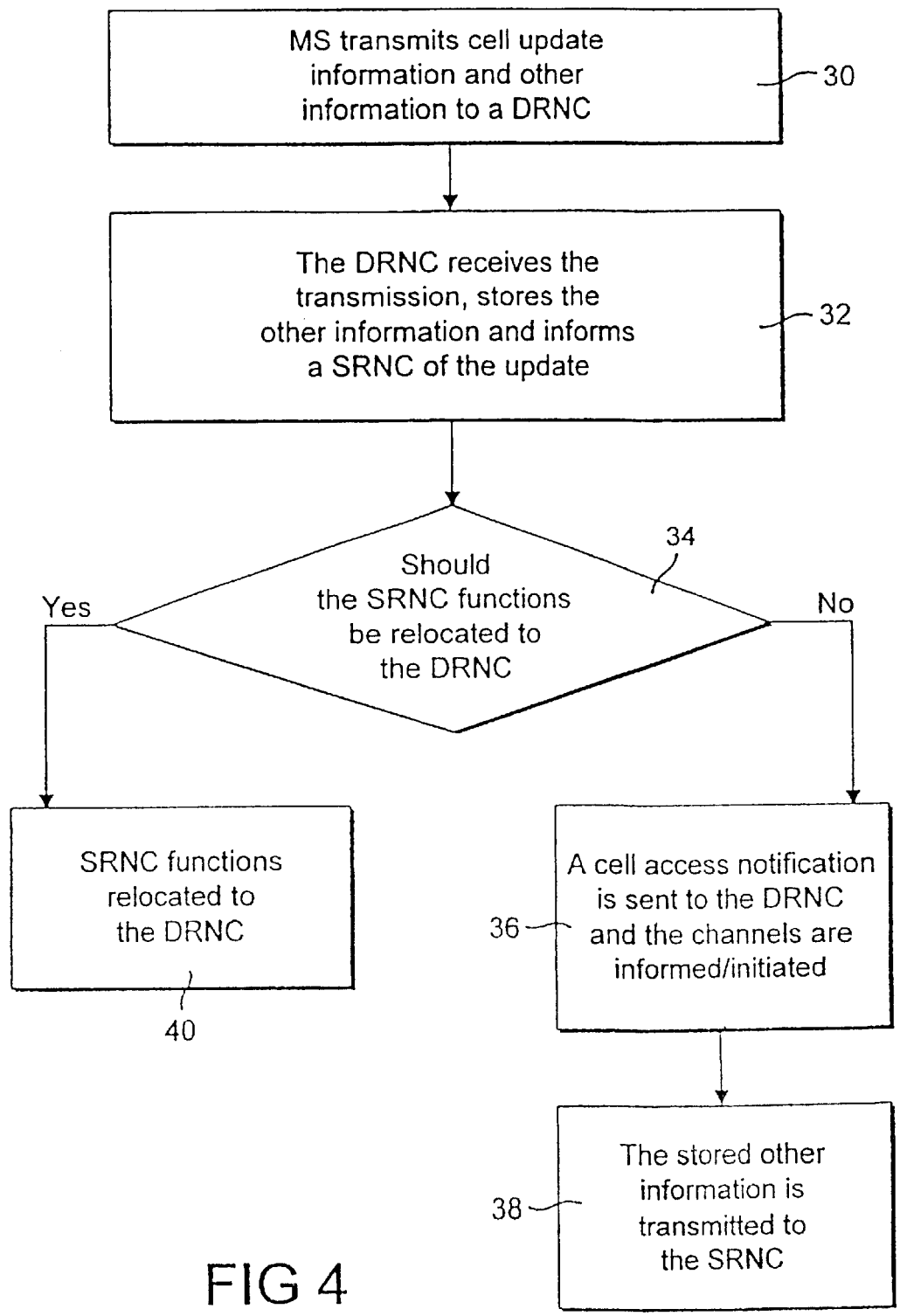
FIG. 4 is a flow chart for operation in accordance with one embodiment.

The method of performing a cell update where a new cell is controlled by a second controller in a cellular communication system is also illustrated by the flow chart of FIG. 4 by the term of the given example, i.e. by a drift RNC. The cell update information can be included in a message sent by the mobile station at step 30 to the DRNC. The message includes also user related data and other information which should be routed to the SRNC. At step 32 the DRNC receives the message, buffers the user data and any other information content, and notifies the SRNC that it has received information from the MS, i.e. that MS has initiated communication wit the DRNC. According to one embodiment the message indicates that cell update information has been received at the DRNC. At step 34 the SRNC (or any other node capable of performing this functionality) may decide on whether or not to relocate the SRNC functionality of the connection to the DRNC. If the relocation is not performed, the SRNC sends the DRNC a cell access notification message and informs the DRNC of the Iur channels (step 36). If required, the SNRC also initiates the channels. Having the Iur channels established the stored user data is sent from the DRNC to the SRNC at step 38. If it was decided at step 34 that the SRNC functionalities are to be relocated, then this is performed at step 40.

It is noted that the above disclosed solution is applicable also in case of a URA update and a RRC connection re-establishment. The URA update corresponds substantially the cell update, the difference lying in the fact that URA forms a group of cells. In the RRC connection reestablishment the procedure is performed between the serving RRC and a new RRC, wherein the relocation of required channels can be handled by means of the disclosed solution.

It should be appreciated that whilst embodiments of the present invention have been described in relation to mobile stations, embodiments of the present invention are applicable to any other suitable type of user equipment.

The data is described as being in packet form. In alternative embodiments of the invention the data may be sent in any suitable format.

The embodiment of the present invention has been described in the context of a CDMA system. This invention is also applicable to any other access techniques including frequency division multiple access and time division multiple access as well as any hybrids thereof.

It should also be appreciated that base stations can sometimes be referred to as node B. In addition, the term cell is intended to cover also a group of cells in instances where more than one cell is controlled by a controller entity (for instance a URA update).

The embodiment of the invention has discussed the interface between two radio network controllers. Embodiments of the present invention can be applicable to other network elements where applicable.

It is also noted herein that while the above describes one exemplifying embodiment of the invention, there are several variations and modifications which may be made to the disclosed solution without departing from the scope of the present invention as defined in the appended claims.

What is claimed is:

1. A method of performing a cell update procedure for a station in a cellular communications system, the cellular communication comprising a plurality of cells, and a first and a second network controllers, said station initially being on a first cell controlled by the first controller and then a second cell controlled by the second controller, the method comprising the steps of:

sending, when the station is in the second cell of the system, cell update information together with other information from the station to the second controller;

storing the received other information at the second controller;

sending from the second controller to the first controller a message indicating that cell update information has been received at the second controller from the station;

determining whether or not the first controller functions are to be relocated to the second controller; and if the functions are not to be relocated to said second controller, sending the stored other information to the said first controller via an interface between the first and second controllers.

2. The method according to claim 1, further comprising the step of initiating a channel in the interface between said first and second controllers before sending the stored other information to the first controller.

3. The method according to claim 1, wherein a user plane connection between the first controller and the second controller is established only in the even that the functions of the first controller are not relocated.

4. The method according to claim 1, wherein the cellular communications system is a code division multiple access network.

5. The method according to claim 1, wherein the second cell is accessed by said station over a data channel.

6. The method according to claim 1, wherein the message sent from the second controller comprises the identity of the station used by the first controller, the identity of the station used by the second controller and information identifying the second cell.

7. The method according to claim 1, wherein said first and second controllers comprise radio network controllers.

8. The method according to claim 1, wherein said first controller comprises a serving radio network controller.

9. The method according to claim 1, wherein said station comprises a mobile station.

10. The method according to claim 1, wherein the said other information comprises user data.

11. An arrangement in a cellular communications system, the cellular communications system comprising a plurality of cells, a first controller controlling a first cell of the plurality of cells, a second controller controlling a second cell of the plurality of cells, and a station capable of communication with said controllers, comprising:
- means for sending, when the station changes from communicating with the first controller to communicate with the second controller, cell update information together with other information from the station to the second controller;
- storage means at the second controller for storing the received other information;
- means for creating and sending from the second controller to the first controller a message indicating that cell update information has been received at the second controller from the mobile station without sending said other information to the first controller;
- means for determining whether or not the first controller functions are to be relocated to the second controller; and
- means for sending the stored other information to the first controller via an interface between the first and second controller, if the functions are not to be relocated to the second controller.

12. The arrangement according to claim 11, wherein the cellular communications system is a cellular radio network, the station is a mobile station and the controllers comprise radio network controllers and further comprising:
- means at the first radio network controller for creating and sending a cell access acknowledgement message and information concerning an Lur interface between the first radio network controller and the second network controller in the even that there will not be a relocation process of the functions;
- means for receiving the cell access acknowledgement at the second radio network controller; and
- means for sending the stored other information to the first radio network controller via said Iur interface as response to said received cell access acknowledgement message.

13. The arrangement according to claim 12, further including means for initiating the Jur interface before the means for sending said other information initiate the transmission of said other information to the first radio network controller.

14. The arrangement according to claim 11, wherein the cellular communications system is a code division multiple access network.

15. The arrangement according to claim 11, wherein the station communicates with the controllers of a data Channel.

16. The arrangement according to claim 11, wherein the first controller is a serving radio network controller.

17. An apparatus for use in a cellular communications system, the cellular communications system comprising a plurality of cells, a first controller controlling the a first cell of the plurality of cells, a second controller controlling a second cell of the plurality of cells, and a station capable of communicating with said controllers, wherein the cellular communications system comprises sending, when the station changes from communicating with the first controller to communicate with the second controller, cell update information together with other information is sent from the station to the second controller, said apparatus is included in the second controller and comprising:
- storage means at the second controller for storing the other information upon receipt at the second controller;
- means for creating and sending from the second controller to the first controller a message indicating that cell update information has been received at the second controller from the mobile station without sending other information to the first controller;
- means for determining whether or not the first controller functions are to be relocated to the second controller; and
- means for receiving a cell access acknowledgement message from the first controller and for sending the stored other information to the first controller via an interface between the first and second controller as a response to said received access acknowledgement message, if the functions are not to be relocated to the second controller.

18. A method of performing a cell update procedure for a station in a cellular communications system, the cellular communication comprising a plurality of cells, and a first and a second network controllers, said station initially being on a first cell controlled by the first controller and then a second cell controlled by the second controller, the method comprising the steps of:
- sending, when the station is in the second cell of the system, cell update information together with other information from the station to the second controller, wherein said other information comprises user data;
- storing the received other information at the second controller;
- sending from the second controller to the first controller a message indicating that cell update information has been received at the second controller from the station;
- determining whether or not the first controller functions are to be relocated to the second controller; and
- if the functions are not to be relocated to said second controller, sending the stored other information to the said first controller via an interface between the first and second controllers.

* * * * *